April 23, 1929.  J. E. CANOOSE  1,710,044
FUEL PUMP FOR GAS ENGINES
Filed July 21, 1926   6 Sheets-Sheet 1

J. E. Canoose
Inventor

April 23, 1929.  J. E. CANOOSE  1,710,044
FUEL PUMP FOR GAS ENGINES
Filed July 21, 1926  6 Sheets-Sheet 2

J. E. Canoose
Inventor

April 23, 1929.  J. E. CANOOSE  1,710,044
FUEL PUMP FOR GAS ENGINES
Filed July 21, 1926    6 Sheets-Sheet 3
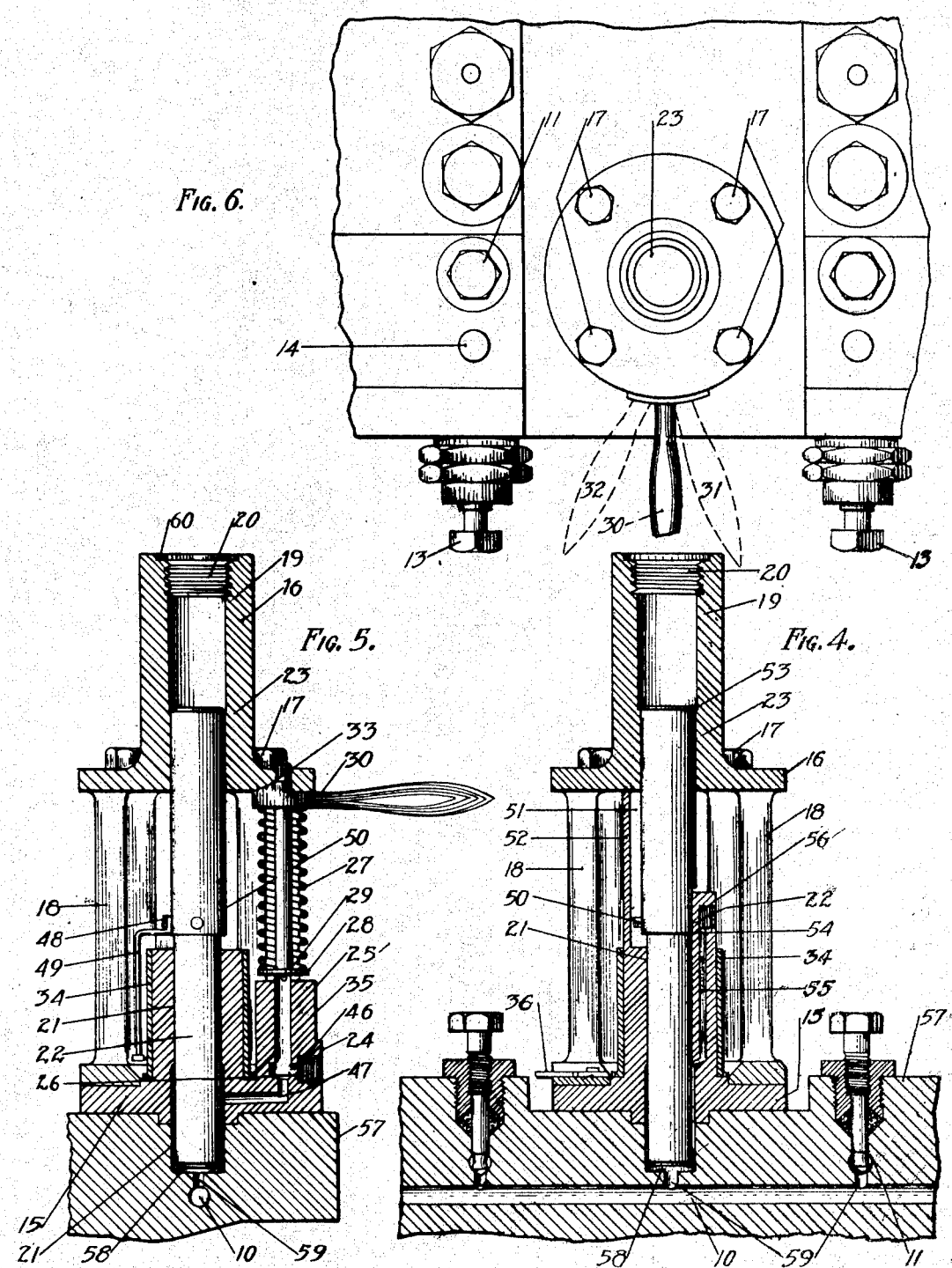

April 23, 1929.　　　　J. E. CANOOSE　　　　1,710,044
FUEL PUMP FOR GAS ENGINES
Filed July 21, 1926　　　6 Sheets-Sheet 4
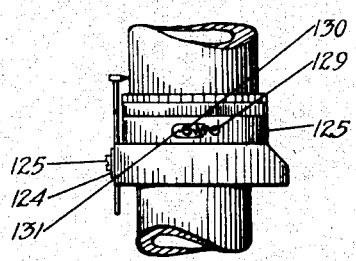
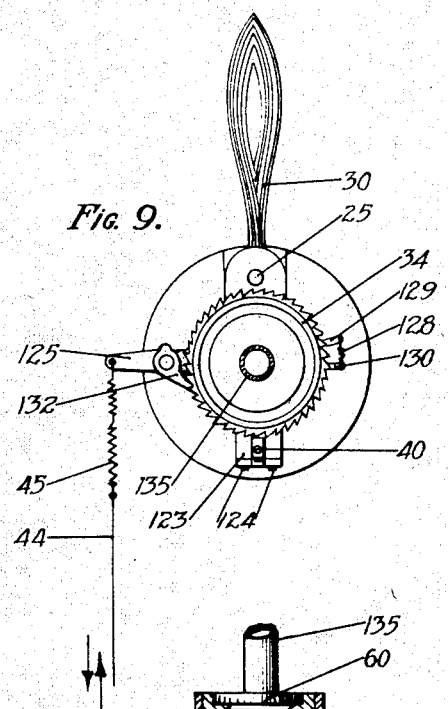
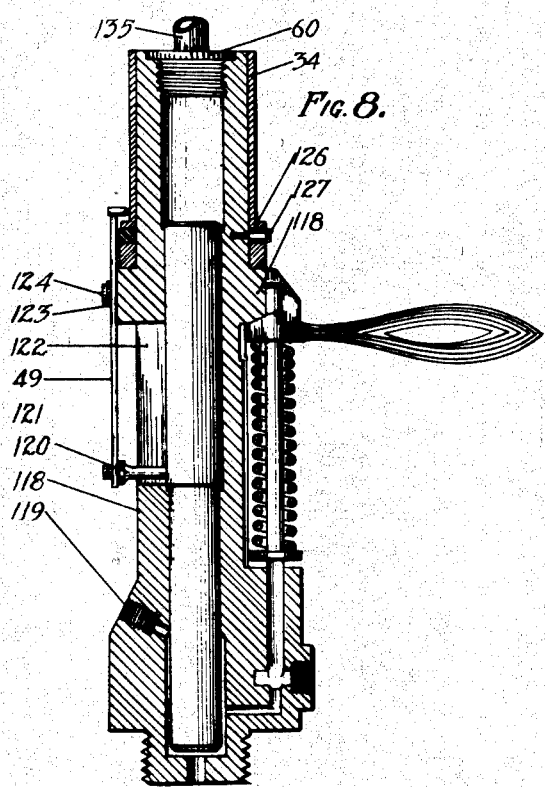
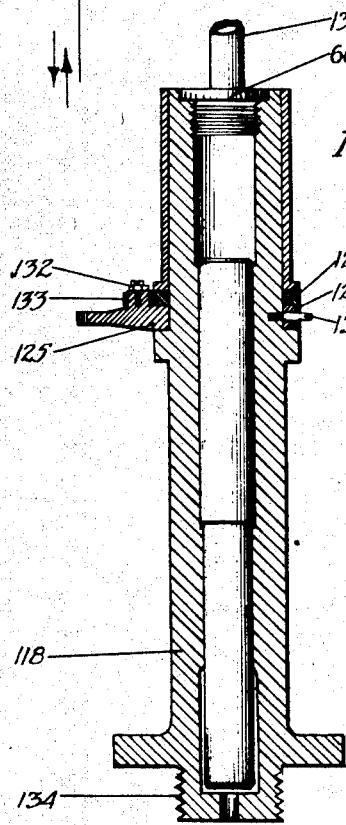

April 23, 1929.  J. E. CANOOSE  1,710,044

FUEL PUMP FOR GAS ENGINES

Filed July 21, 1926  6 Sheets-Sheet 6

J E Canoose
Inventor

Patented Apr. 23, 1929.

1,710,044

UNITED STATES PATENT OFFICE.

JOHN E. CANOOSE, OF NEW LONDON, CONNECTICUT.

FUEL PUMP FOR GAS ENGINES.

Application filed July 21, 1926. Serial No. 124,065.

This invention relates to improvements in gas engines and more particularly to volume indicators with necessary accessories for gas engines of the Diesel type or of any type wherein a pump is used to force oil or other liquid fuel to the working cylinder or cylinders of the engine.

In order that a clearer perception of the present invention may be had and of the object sought to be accomplished thereby, the volume indicator with its accessories will be hereinafter described with particular relation to its application to Diesel engines for measuring without stopping the engine, the amount of fuel being delivered to the various cylinders, thereby enabling the operator to determine easily and with extreme accuracy the performance of the fuel measuring pump without having to resort to the tedious and usual method of taking indicator cards, of the pressure type, on the working cylinders or other tedious methods described below.

The desideratum of the present invention is:

First, to accurately measure the amount of fuel being delivered to any or all working cylinders while the engine is running thereby determining the net amount of fuel the cylinder (or cylinders) is receiving.

Second, to obtain the above accurate measurement without recourse to the inconvenience of having to measure in a graduated vessel the amount of fuel delivered in a certain time.

Third, to have the indicator record curves of such type that all those for one engine, i. e. six for a six cylinder engine, eight for an eight cylinder engine etc. can be put on the same indicator card.

Fourth, to have the record curves of such type that two or more pump cycles may be superimposed thereby reducing any personal error present in measuring the indicator record curves.

Fifth, to provide an efficient instrument, for making the above specified records, which is rugged, is of simple construction, is comparatively inexpensive to manufacture, and which will require the minimum of work to keep same in good working condition.

Sixth, to provide a simple instrument which will not require a reducing motion for actuating the indicator drum and in fact one where the drum motion bears no relation to the fuel pump piston motion.

Seventh, to provide an absolutely accurate measurement of the fuel delivered irrespective of the condition of the fuel pump plunger, valves or plunger packing or of the pressure against which the pump works. These functions cannot be obtained with devices now in standard use. These last mentioned devices are open to a number of objections, for example:

First, the common method of opening a by-pass valve at the spray valve and measuring in a graduated vessel the amount of fuel delivered in a given length of time is extremely inaccurate because the pump is then not working against the normal working pressure; there is danger of spilling fuel in handling; due to the meniscus formed at the sides of the vessel, a correct reading in the graduated vessel is difficult; and the whole operation is very inconvenient and distasteful due to danger of spilling fuel on the operator or on the engine.

Second, the method of installing a relief valve between the pump and the working cylinder, which relief valve discharges into a graduated vessel when the fuel is prevented from going to the working cylinder, is open to all of the objections above outlined except that it can be made more accurate by adjusting the lifting pressure of the relief valve to correspond to the pressure against which the fuel pump normally works. It adds another very objectionable feature, however, in that it is necessary to stop the engine to install the relief valve unless one is used and kept permanently installed in each fuel line between the pump and the spray valve. Again, in air injection engines where the delivery pressure in the pump varies due to the spray air pressure varying, it is difficult to adjust the relief valve to function at the various pressures as it must each time be tested in a system having a pressure gauge. Pressure gauges are not ordinarily installed on fuel lines.

Third, the method of taking indicator cards to determine the amount of fuel being delivered to the working cylinder, i. e. pressure-volume indicator cards, is open to several important objections:

(a) Due to the delicate nature of the pressure indicator it cannot be kept permanently attached to the working cylinder. It therefore must be set up on the cylinder each time a card is to be taken. This means that the reducing motion drive for the pressure indicator drum has to be installed, where, as is often the case, the reducing motion is not in continuous operation. At best the setting up of a pressure indicator on each working cylinder to determine the amount of fuel going to each cylinder is quite a large undertaking. It should be remembered that the pressure indicator must be cleaned after using. This is tedious, and is particularly troublesome in cases where a separate indicator is used for each working cylinder.

(b) The average pressure indicator is very sensitive to heating, i. e. the high heat from the Diesel engine cylinder causes distortion of the pressure indicator parts which causes the instrument to be inaccurate.

(c) Many other errors are existant in pressure indicators. These are: disproportionate motion reduction causing errors in the area recorded on the indicator card; errors due to lost motion in the reducing motion joints or drive; errors due to variation in the timing of reducing motion cams where same are used; in fact, when there is any error in the reducing motion, an error in the pressure indicator card follows.

(d) The personal error incident to measuring pressure indicator card mean effective pressures is important. This error is due to two causes. First, the error in using the planimeter while running the needle around following the outline of the card. Second, measuring the distance between the points thus found by the planimeter. This total personal error is relatively larger at low mean effective pressures than at high mean effective pressures.

(e) To determine the mean effective pressure from a pressure indicator card requires the use of a planimeter or averaging instrument or the use of ordinates. The latter method is particularly laborious.

(f) Finally, indicator card mean effective pressures are not an accurate measure of the amount of fuel being delivered to the working cylinder. Many other things such as leaky valves; leaking piston rings, improper atomization of fuel; improper distribution of fuel where more than one spray valve is used; inefficient scavenging of the cylinder; reduction of amount of air reaching a cylinder due to obstruction of the inlet, or to reduction of amount of air passing through the spray valve etc. can reduce the mean effective pressure materially. The fact that one cylinder does have a higher mean effective pressure than another does not indicate that the unequal pressures are entirely proportional to the fuel being delivered to the two cylinders involved.

A further objection to the use of pressure indicators is the fact that they wear fast in use and have very delicate parts which are difficult to obtain and are very expensive.

It is therefore a further object of the present invention to provide a practicable and simple but accurate means for measuring the amount of fuel being delivered to the various working cylinders without encountering the difficulties and faults above noted and common to the usual pressure indicators and other devices now in use.

A further object is to provide a mechanism that may be inexpensively manufactured and assembled; not likely to get out of order in use; requiring no special attention to cleaning as is required with the pressure indicator; and which can be manufactured or repaired in a machine shop with ordinary tools.

It is to be observed that while the description of the application of this invention to Diesel engines will deal particularly with Diesel engines of air injection type the invention is equally applicable to engines of mechanical injection or the so-called "solid injection" or "airless injection" type.

In the accompanying drawings wherein similar parts are denoted by corresponding reference characters Figure 1 is a section through a fuel pump unit of conventional type with a side elevation of the volume indicator added as a part of the pump.

Figure 4 is a longitudinal section through the center of the volume indicator and a coincident plane in the pump.

Figure 5 is a longitudinal section through the center of the volume indicator in a plane at right angles to the section plane shown in Figure 4.

Figure 6 is a plan view of the volume indicator showing two adjacent fuel pump units.

Figures 1, 2, 3, 4, 5, and 6 all show indicators of two piece body construction.

Figures 7 and 8 show two longitudinal sections, 90 degrees from each other, of a volume indicator of one piece body construction.

Figure 9 is a plan view of Figures 7 and 8.

Figure 10 is an elevation view of a part of Figures 7 and 8.

Figure 11:
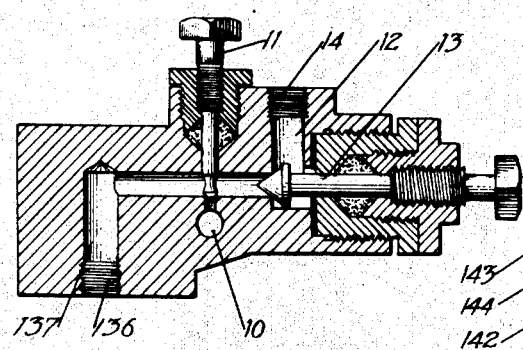
Figure 12:
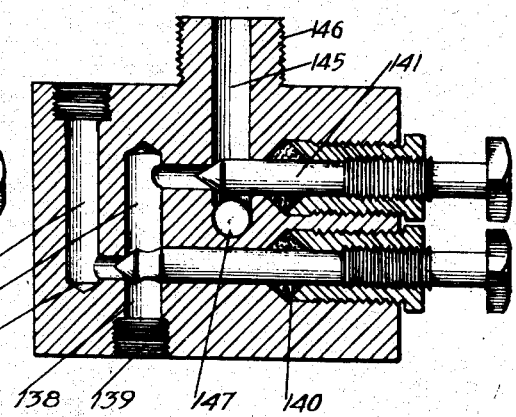
Figure 3:
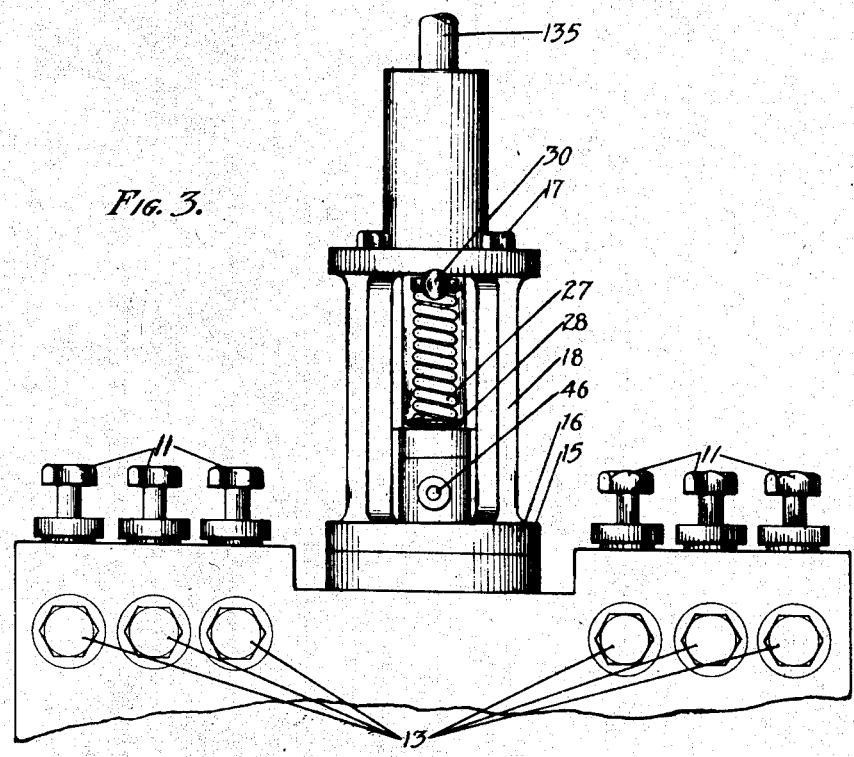
Figure 3 is a front elevation of a conventional pump with the volume indicator installed as a part of the pump.

Figures 11 and 12 are sections of two types of manifolds to be used when the volume indicator is not to be attached directly to the fuel pump.

Figure 13:
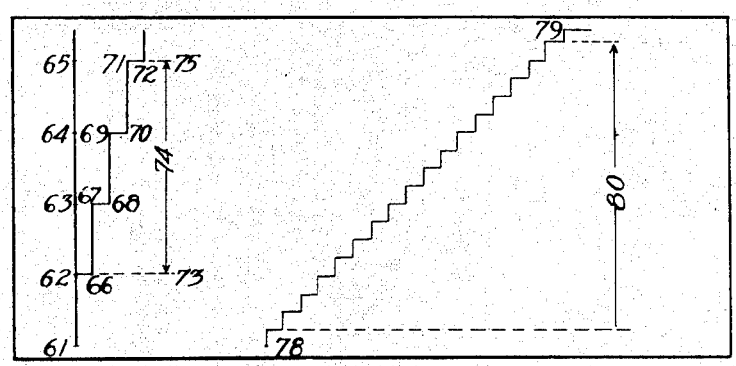

Figure 13 is a descriptive volume indicator card which shows a graph for high power and another for low power.

Figure 14:
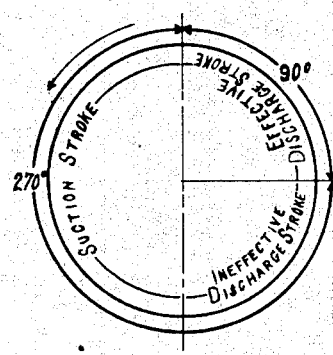

Figure 14 is a cycle diagram of the conventional fuel measuring pump using a controlled suction valve for regulating the pump output to the spray valve.

Figure 15:
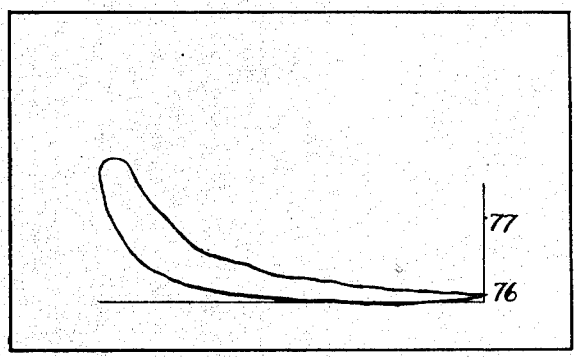

Figure 15 is an indicator card obtained from an ordinary pressure type indicator when used on a Diesel engine working cylinder.

Figure 16:
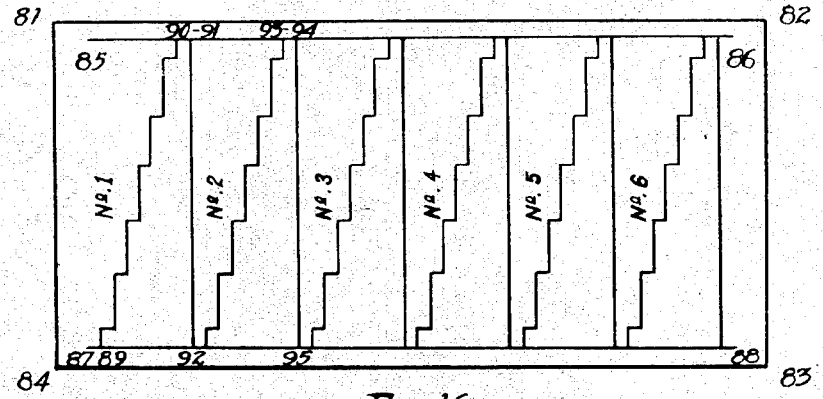

Figure 16 is a volume indicator card showing record graph for all six pump cylinders on the same card.

Figure 17:
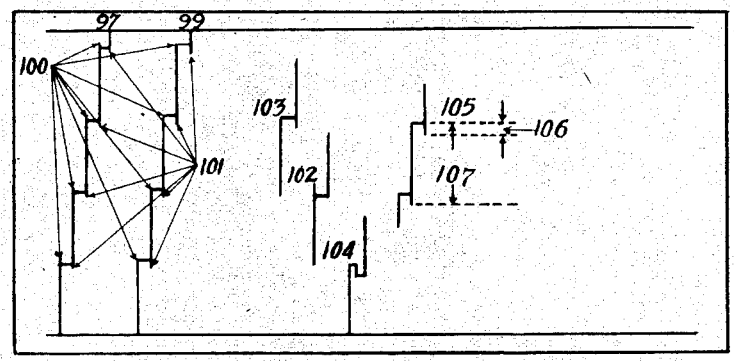

Figure 17 is a volume indicator card which shows various peculiarities of record graph form which will obtain from various pump faults.

Figures 1, 2:
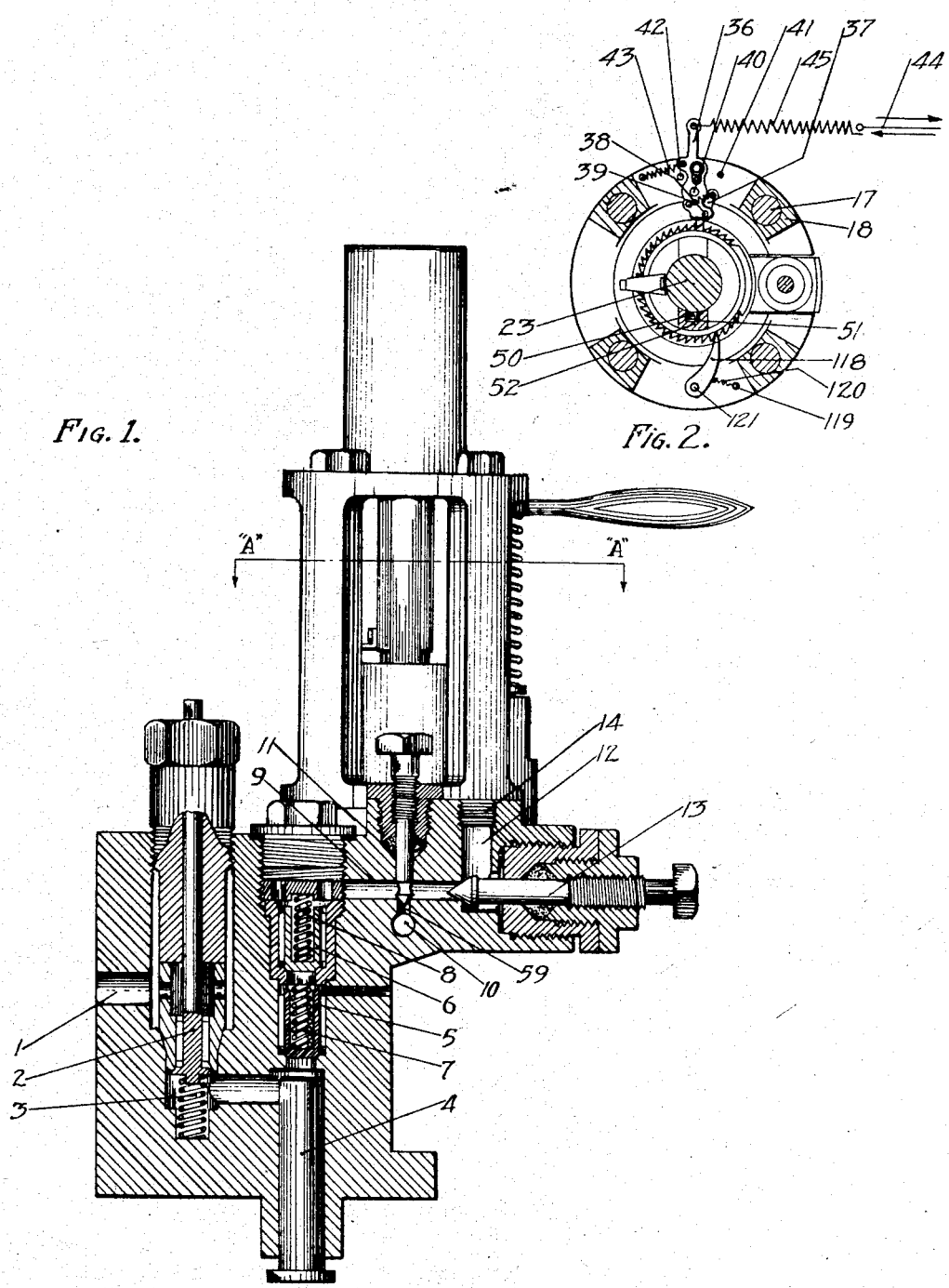
Figure 2 is a section of the volume indicator at AA of Figure 1.
Figure 18:
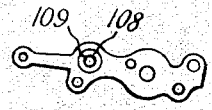

Figure 18 is a plan view of lever, 36, of Figure 2.

Figure 19:
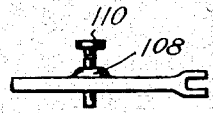

Figure 19 is a side elevation of lever 36, showing the pin 110 passing through the bottom.

Figures 20, 21, 22:

Figure 20 is a view of the pin, 110.

Figure 21 is a view of the screw.

Figure 22 is a view of the pin retention spring.

Figure 23:
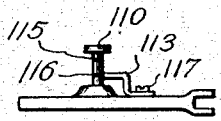

Figure 23 is view of the lever, 36, with the point of pin 110 flush with bottom of lever.

In the following discussion the conventional fuel measuring pump using a controlled suction valve for regulating the amount of fuel delivered to the spray valves will be used. It is quite evident that the volume indicator herein described, and which is the present invention, is applicable to any pump which measures and delivers predetermined amounts to the working cylinder for each engine cycle.

Referring now to the drawings in detail and more particularly to Figure 1 wherein is shown the volume indicator attached to the fuel measuring pump, 1 is the fuel pump suction, 2 the fuel pump suction valve, 3 the suction valve spring, 4 the pump plunger and 5 and 6 discharge valves, with 7 and 8 the discharge valve springs. Now in the conventional pump the passage 9 would be terminated with a threaded connection to which the fuel line leading to the spray valve in the working cylinder would be attached. In this invention the passage 9 is communicated with passage 10 by a valve 11 which is of the passover type so that when it is closed it does not prevent fuel from passing by it through passage 9. Passage 9 is communicated with passage 12 by valve 13. Passage 12 terminates in the threaded connection 14 to which the fuel line leading to the spray valve on the working cylinder is connected. In Figures 4 and 5 the passage 10 of Figure 1 is indicated by the same number and in Figure 4 the valve 11 is the valve 11 shown in Figure 1. In fact in all figures, similar parts bear similar reference numbers.

Continuing with Figures 4 and 5 the volume indicator proper will be described. In these figures 15 is the lower part of the volume indicator body and 16 the upper part of the body. These two parts of the body are held together by long cap screws 17 which pass down through the columns 18. The upper part of the body has in its center a cylinder 19 fitted with a threaded connection 20 at its top. The lower part of the body has a cylinder 21, concentrically arranged in reference to the upper cylinder, 19. The upper cylinder is slightly larger than the lower cylinder as shown and as will be described later. In these cylinders are fitted the pistons or plungers 22 and 23. These plungers should be made separately if there is any question as to the perfect alignment of the two cylinders. It is of course possible and less expensive to make the two plungers in one piece.

The lower part of the body has an extension, 24, in which is fitted the relief, 25. This valve is held on its seat, 26, by a spring, 27, which rests on a washer, 28, which in turn is held in position on the valve by pin, 29. The upper end of the spring rests against a cam lever, 30, which in turn rests against the flange of the upper part of the body, 16. This cam is so arranged that when the lever is in position, 31, Figure 6, its upper face rests against the flange of the upper body. When it is in position, 32, of same figure however, the cam surface, 33, acts against a similar but opposed surface in the body flange and causes the cam to be driven downward from the body flange thereby compressing the spring, 27, more than when the lever is in position, 31.

Relief valve outlet connection 46 is connected to the lower cylinder 21 by port 47.

The lower part of the body has the outside of the cylinder, 21, turned concentric to the cylinder bore to receive the indicator drum, 34. The drum, 34, has at its lower end a flange, 35, on which is cut ratchet teeth. Into these teeth work a ratchet lever and pawl shown in Figure 4, and Figure 2, parts, 36, and 37, respectively. The pawl, 37, is fulcrumed in lever 36 on pin 38 and is held extended into the ratchet teeth on the drum by spring 39. The lever, 36, is fulcrumed on pin, 40; and is limited in its travel by stop pins, 41, and 42. The lever is normally held against stop, 42, by spring, 43. The lever is actuated by any oscillating or reciprocating motion to which string, 44, is attached. Between string, 44, and the lever 36 is a spring, 45, which allows any motion in excess of the lever motion to be absorbed by the spring, 45. This arrangement allows almost any motion to be used to operate the ratchet as will be discussed further, later.

The upper plunger, 23, has attached to it, by screw, 48, the pencil holder, 49. It also carries a stud, 50, which slides in a slot, 51, which slot is cut in an extension, 52, of the lower cylinder. This extension is shown more clearly in Figure 2.

The indicator card is held on the drum, 34, in the conventional manner by a clip not shown in any of the figures.

Both the upper and lower cylinders have a counter-bore beginning at points, 53, and, 54, respectively. The counter-bore in the lower cylinder is needed to permit clearing the lower cylinder of air should any air be passed through from the fuel pump. To this end a passage, 55, terminating in a threaded connection, 56, is provided. A small pet cock of conventional type may be used in this threaded connection for permitting any accumulated air or gas to escape.

To reduce the height of the volume indicator the fuel pump block, 57, can be bored to form part of the counter-bore of the lower cylinder as shown at 58 of Figures 4 and 5. This counter-bore is connected with passage 10 by passage 59.

A description of the function of the volume indicator will now be given: but before starting the description it is desirable to state specifically what the desired conditions to be met are.

As was stated above, it is essential that measurement of the fuel pump discharge should be made against the actual pressure against which the fuel pump works when it is delivering normally to the spray valve. This actual discharge pressure is composed of two parts:

First, the back pressure due to spray air, which is always existant in closed type spray valves, and which is equal to the spray air pressure;

Second, the back pressure due to the relief valve action of the fuel check valves at the spray valve combined with the back pressure due to the resistance to fluid flow in the line leading to the spray valve.

Now the spray air pressure varies with different load and speed conditions in the engine; but the back pressure due to check valve and line resistance action may be considered practically constant for any one type of design. The line resistance will vary slightly with fluid flow velocity; but this variation may generally be considered as negligible. Hence for practical purposes the spray air may be considered as the only back pressure variable to be considered. The value of the back pressure factor due to check valve action and line resistance varies with different designs, but in some cases is about 250 lbs. per square inch. Let the value of the back pressure factor be represented by X. Therefore, the volume indicator should operate against a pressure of spray air pressure plus 250 lbs. for the particular design above considered. In case the check and line back pressure is different from 250 lbs. per square inch and we call this total check and line back pressure X, then in general the volume indicator should work against spray air pressure plus X pressure. This may be accomplished as will be described.

For practical purposes fuel oil may be considered non-compressible within the pressure ranges which exist in fuel pumps and lines leading to spray valves, in air injection engines. Also assuming uniform air entrainment the fuel oil may be considered uniformly compressible over higher pressure ranges such as exist in airless injection engine fuel distribution systems.

Referring now to Figures 1, 4 and 5, it is seen that when valve, 11, is opened and valve, 13, closed the fuel stops going to the spray valve and flows through passages 9, 59 and 10 to the under side of piston 22. If the piston 22 is free to move the oil will drive it upward. Also due to the fact that the fuel oil is practically non-compressible the motion of the piston will be as regular as the flow of the fuel to the under side of same.

To the threaded connection 20, of cylinder, 19, a branch of the spray air line is connected. Thus the cylinder 19 has spray air pressure in it when spray air is on the spray air line.

If plungers 22, 23 were of equal size, i. e. of equal diameter, then the pressure on the oil in cylinder, 21, would equal the pressure of the spray air as the plungers are free to move to balance the pressures above and below the plungers. But it was shown above that it is desirable to work against spray air pressure plus the back pressure from check valves and fuel line resistance. To obtain this the upper plunger, 23, is made slightly larger in diameter than the lower plunger, 22. This increases the total pressure above and below the plungers; but as the area of the lower plunger is not increased, the unit lower pressure is increased. By properly proportioning the areas of the two plungers the pressure of the oil under the plungers may be raised any desired amount above that of the spray air.

Assume that the oil is directed to the lower cylinder as described above and that the plunger, 22, is equal in diameter to the fuel pump plunger, 4, Figure 1. When the fuel pump plunger starts delivering to the lower indicator cylinder, 58, the plunger, 22, will travel upward against the spray air pressure a distance equal to the fuel pump plunger effective delivery travel. As the upper plunger is prevented from turning by guide pin, 50, sliding in slot, 51, the indicator pencil, 49, will make a straight vertical mark on the indicator card of length equal to the effective travel of the fuel pump plunger, less any leakage in valves or packing that occurs. Assuming no leakage, and an effective pump plunger travel of one half inch, the pencil mark would be one half inch in length. Referring now to Figure 13 let the limits of this mark be points 61 and 62. Point, 62, represents the end of the pump discharge stroke; and, as the discharge valves are assumed tight, there will be no reversed fluid flow from below the indicator piston. Hence, the pencil will stand still at point, 62, until the next effective stroke commences. During the next stroke it will move up to point, 63, and during succeeding strokes to points, 64 and 65. Thus when the pincil reaches the top of the card, it will have made a straight vertical line on the card from bottom to top; but it will have left no record of the beginning or ending of pump delivery strokes. To establish a record of the beginning and end of pump delivery strokes it is necessary to move the indicator card drum, 34, Figure 4, slightly, between pump strokes. This is accomplished by the ratchet mechanism parts 35, 36, 37, 38, 39, 40, 41, 42 and 43 of Figures 2 and 4.

It should be noted here that it makes no difference what time during the pump cycle the indicator drum is moved by the ratchet provided that it is not moved during the effective stroke.

Refer now to Figure 14. This shows the conventional cycle diagram for the fuel measuring pump where only the last half of the discharge stroke is effective. Thus it is apparent that the effective travel for full power corresponds to 90° of pump crank travel. As it was stated above that the volume indicator drum should not be moved during the effective travel; and as this effective travel is a maximum of 90 degrees of pump crank travel, it follows that the indicator drum can be moved by the ratchet at any time during 270 degrees of pump crank travel. Further, as was set forth above, the ratchet lever may be driven from any moving part of the engine which moves through the same number of cycles per minute as the fuel pump.

Therefore it is evident that great flexibility of ratchet drive is afforded and as set forth above, no proportional reducing drive motion such as is required for pressure indicators is needed.

Referring again to Figure 13 and assuming the fuel to be directed to the under side of the indicator plunger, 22, of Figure 4, and assuming the ratchet for moving the indicator drum to be in action and further assuming the indicator plunger to be at the bottom of its stroke; when the fuel pump plunger, 4, of Figure 1, starts on its effective discharge stroke, the indicator pencil moves upward from point, 61, and as before stops at point 62. Between this time and the time the plunger commences its next effective stroke, the ratchet moves the drum so that the pencil moves to point 66. The ratchet is operated by string 44 that is attached to any suitable moving part of the engine, such as the crosshead or the like. The movement thus imparted to the ratchet causes it to turn about its pivot, and as pawl 37, that is mounted on the ratchet, engages with the ratchet teeth on the drum, the latter is revolved sufficiently to allow the pencil to begin its next upward stroke in a line different from the preceding one. Then on the next effective pump stroke the pencil moves upward to point, 67. Between effective strokes the indicator drum is again moved by the ratchet so that the pencil travels from 67 to 68. In like manner the curve is continued upward through points 69, 70, 71, 72 and to point 75. We then have, as a record of the fuel pump performance the graph through points 61, 62, 66, 67, 68, 69, 70, 71, 72 and 75.

Now as the length of the vertical lines represent, directly, effective fuel pump plunger travel; to determine the effective plunger travel from the card it is only necessary to measure the length of the vertical lines, i. e., the distance from 61 to 62, 66 to 67 etc.

There is always a small personal error to be considered in measuring distances on indicator cards. It is desirable to reduce the effect of this error as much as possible. It is practicable to reduce the effect of this error in volume indicator cards very materially by extending the horizontal line passing through points 62 and 66 to points 73, as shown, and then measuring the distance, 74, with a scale. As this covers three pump cycles superimposed on each other the effect of a personal error in measuring is reduced to one third of what it would be for only one step.

It is important to note that, though the record graph extends from the lower extreme of the card to the upper extreme, there is no assurance that the point, 61, as shown marks the beginning of a pump stroke. Likewise, there is no assurance that point, 75, represents the end of a pump stroke. But lines passing through points 62 and 66 and 71 and 72 do represent the ends of pump strokes; therefore, they may be used with certainty for measuring the plunger effective travel. Obviously, the first and last steps in the graph should be used.

Referring now to Figure 15, let it be assumed that the mean effective pressure is to be determined by use of a planimeter. The usual and simplest method is to start at point 76, with planimeter wheel scale at zero and run the planimeter needle around the card back to point 76. Then the planimeter needle is moved up a vertical line until the planimeter wheel scale again registers zero. This position is represented here by point 77. The distance between points 76 and 77 is then measured to determine the mean effective pressure.

Now it is obvious that there are two personal errors involved in this measurement:

First, that due to running the planimeter needle around the indicator card;

Second that due to measuring the distance between points 76 and 77.

These two errors, plainly, may be cumulative or differential; but the accumulative effect must be considered. The first error is fairly large at times and requires greater deftness on the part of the operator than does the latter operation.

Considering now the last operation, assume that the line, 76 to 77, of Figure 15 is one half inch long, and that an error of one one hundredth inch is made in measuring the line. Then the percentage of error is equal to $\frac{.01}{.50}=.02$, $.02\times100=2$ per cent.

Again, assume that the line 76, to, 77, is only one eighth inch long and the error in measuring is again one one hundredth inch. Here the percentage of error is $\frac{.01}{.125}=.08$, $.08\times100=8$ per cent. The same effect obtains from the first error.

From these considerations it is plain that the relative effect of the personal error in measuring pressure indicator cards varies inversely as the mean effective pressure of the cards considered, i. e., the accuracy is greatest where the mean effective pressure is greatest and the accuracy least where the mean effective pressure is the minimum. As smoothness of operation at low powers depends on fineness of balance of mean effective pressures and as the personal measuring accuracy variation is unfavorable to low mean effective pressures it follows that the pressure indicator card is at a disadvantage at low engine powers.

Consider now the possibilities of the volume indicator card. Assume that the graph of Figure 13 passing through points 61, 62, 66, 67, 68, 69, 70, 71, 72 and 75, represents the fuel pump record for full power. Assume, also, that each of the vertical steps 66 to 67, 68 to 69 and 70 to 71 are equal in length and are each one half inch long. Then the distance, 74, is equal to one and one half inches. Assume further, that the same personal error is made in measuring this line as was assumed made in measuring line, 76 to 77, of Figure 15, viz., one one hundredth inch. Then the percentage of this error will be: $\frac{.01\times100}{1.5}=.66$ per cent, or one third of that which obtained in measuring the pressure indicator card of Figure 15 for full power. Compared with the error which obtained from the pressure indicator card where only one eighth inch length was assumed for line, 76, to 77 of Figure 15, i. e. low power condition, $\frac{8}{.666}=12.$, we find that the personal error amounts to only one twelfth of that found in the case of the pressure indicator card.

Now in the case of low engine powers the volume indicator card will look like graph, 78, to 79, of Figure 13. The vertical steps in this graph are assumed one eighth inch long. This is the same as the low length assumed in case of the low mean effective pressure in the pressure indicator card in making comparisons above. As before, the first and last steps from the indicator card upper and low margin will be used. But in this case we are measuring 16 pump cycles superimposed instead of 3 pump cycles superimposed as before. Now as the vertical steps of this graph were assumed one eighth inch in length, the distance 80 is equal to two inches. Again assuming a personal error in measuring of one one hundredth inch we find: $\frac{.01\times100}{2}=.5$ per cent. This is only one sixteenth of the percentage of error found for the low mean effective pressure indicator card.

It is therefore obvious that the accuracy of the volume indicator card is three times as great as that of the pressure indicator card for full power of the engine and it is sixteen times as accurate as the pressure indicator card for low engine powers.

Returning now to graph 61, 62, 66, 67, 68, 69, 70, 71, 72 and 75, of Figure 13, it is evident that when the indicator pencil is at point, 75, the indicator plunger is at the top of its stroke, the upper end of plunger 23 of Figure 5 being against the plug 60. Now if there were no outlet provided for the fuel, something would burst. Outlet provision is made therefore for the excess oil.

Of course, if the valve 13 of Figure 1 could be opened at the instant the volume indicator pencil reaches point 75 of Figure 13, no excess pressure would be developed. But unless valve 11 of same figure were closed at the same time the indicator might discharge a large slug of fuel into the fuel line. This manipulation is impractical.

To obviate these difficulties the relief valve 25 of Figure 5 is provided. As described above, the cam lever, 30, has two positions which provides two different values for the compression of the spring 27.

Now suppose the maximum spray air pressure to be used on an engine is 1200 lbs. per square inch and that the combined check valve and line drop is 300 lbs. per square inch. Then the total pressure is 1500 lbs. Suppose now that it is desired to provide a margin of pressure of 250 lbs. per square inch. Then the relief valve should be set to lift when the pressure reaches 1750 lbs. per square inch. The spring should be so designed that when the cam is in its high compression position the lifting pressure for the relief valve will be 1750 lbs. per square inch.

Threaded connection 46 of Figure 5 is connected by a line to the suction line of the fuel pump.

Now, when the volume indicator plunger 23 of Figure 5 reaches its extreme top position and is stopped by plug 60, the pressure within the fuel pump and within the oil end of the volume indicator will rise to 1750 lbs. per square inch when the relief valve will lift allowing the remainder of the charge and any succeeding charges to flow through threaded connection 46 back to the pump suction. Thus all oil going to the indicator is passed back to the suction, thereby providing a closed circuit, so no fuel oil is at any time liberated to make the operation unclean or distasteful to the operator.

As the relief valve maintains a pressure of 1750 lbs. in the indicator fuel oil end, which is greater than the air pressure above the plunger it is evident that the indicator plunger is to stay at the top of its stroke. Now if the spring and cam lever are so designed that when the cam lever is moved to its low compression position the valve lifts at any pressure between 1250 lbs. and 750 lbs. the indicator plunger will, when the cam is thrown to this low compression position, move downward driving the fuel oil out to the suction of the pump. Thus relieving the pressure to a lower pressure but not reducing it to zero has two distinct advantages:

(a) First, it prevents the indicator plunger from being driven down violently striking the bottom of its cylinder.

(b) Second, it lessens the effect of the extremely slight compressibility of the fuel oil; and prevents the admission of air from any source to the underside of the indicator plunger.

The indicator fuel oil cylinder can be cleared, of course, with spring having only a single compression adjustment but having a relief lever provided for lifting the valve slightly against the spring pressure thereby allowing the fuel oil to be driven back to the pump suction. This arrangement lacks the advantages attributed to the first mentioned and described one.

The vent connection 55 and 56 of Figure 4 could be used to clear the indicator of fuel oil but should be used only to remove any air or gas accumulated below the indicator plunger.

As will be shown, it is necessary to stop the ratchet action at times. For this function a stop is provided.

Figure 18 is lever 36 of Figure 2. This lever has a boss 108 through which is drilled the hole 109. Into hole 109 is fitted pin 110. This pin may be pushed down so as to have its point flush with the lower side of the lever as shown in Figure 23; or it may be pushed down so as to have its point a short distance through the lever as shown in Figure 19. The pin is held in place by a spring clip, 113, of Figure 22 having a sharp edge, 114, which bears in grooves 115 and 116 of pin 110, of Figure 20. A hole is provided in the body piece 16 of Figure 4 under the lever 36 into which the point of pin 110 (Figure 19) passes when the lever 36 is at rest against pin 41 of Figure 2. When the pin is down so that it is in the hole in the body piece 16 the spring clip sharp edge 114 stands in groove 115 of Figure 20 but when the pin is up so that its point is flush with the lower side of the lever 36 the spring clip sharp edge 114 stands in the groove 116 of pin 110. Spring clip 113 is held in place on lever 36 by screw 117.

When it is desired to stop the ratchet it is necessary only to push down on the pin 110. When this is done the pin engages the hole in the body 16 and stops the ratchet action compelling the spring 45 to absorb all the motion imparted by the driver but not requiring anything to be disconnected. To put the ratchet back into action it is necessary merely to pull the pin upward so as to cause the clip to snap into groove 116 of pin 110.

It will be noticed that the usual stop ratchet pawl for preventing the drum from oscillating with the ratchet lever 36 has been omitted. For most designs this ratchet stop pawl will be found unnecessary, because there is sufficient friction between the drum and the cylinder to prevent the drum from following the retiring stroke of the ratchet. If needed a stop pawl may be provided as shown at 118 of Figure 2. This pawl 118 fulcrums on pin 121 and is held against the ratchet teeth on the drum by compressed spring 120 which in turn rests against pin 119.

Referring now to Figure 16 let the rectangle 81, 82, 83 and 84 represent the volume indicator card, and let lines 85 to 86 and 87 to 88 be the limits of the indicator pencil travel.

Assume that graph 89 to 90 is recorded by the indicator as was curve 61, 62, 66, 67, 69, 70, 71, 72 and 75, described above. When the pencil reaches point 90 the cam lever 30 of Figure 5 is thrown to its low compression position and the indicator plunger 23 moves downward, the pencil making line 91 to 92. Here it is assumed the ratchet described above for moving the indicator drum is stopped from acting by the stop above described. It is obviously desirable to allow the ratchet to move the drum so as to cause the pencil to move from point 90 to point 91 as this separates the curves. When the indicator plunger reaches the bottom of its stroke causing the pencil to stop at point 92, it is necessary to open valve 13 and close valve 11 of Figure 1. Then a valve similar to 11 leading to another cylinder is opened and one similar to 13 is closed and the ratchet thrown back into action. When this is done the graph 92 to 93 is recorded for working cylinder number two. In like manner graphs are obtained for all the working cylinders as shown.

These fuel delivery records for all working cylinders on one indicator card provide an easy comparison between the various units and leave no opportunity for getting records mixed as occurs where a separate pressure card is required for each working cylinder.

The record graphs described above are those which would obtain with no valve leaks or erratic action of the suction or discharge valves. The volume indicator will show these above mentioned and other faults of pump action.

Referring to Figure 17, which represents an indicator card similar to that of Figure 16, graphs 96 to 97 and 98 to 99 show the type of graph which would obtain from a pump having leaky discharge valves. In this case the indicator pencil would make its upward travel to points 100 but between circles it would work downward to points 101. The character of the curve between these points would depend on the degree of leak through the valves, and on the time in the ineffective part of the pump cycle at which the ratchet moves the indicator drum. Diagrams 102, 103 and 104 show three cases that could occur. In any case however the vertical distance between points 100 and 101 of graphs 96 to 97 and 98 to 99 show very definitely the amount of leak which is occuring in the discharge valves. Thus, if at 105 distance 106 is one sixteenth inch and the effective pump stroke 107 is one half inch, then the leak is equal to one eighth of the charge or 12.5 per cent. Obviously this is true whatever the character of the graph between steps.

The vertical steps are regulated in length by the fuel pump suction valve adjustment. If all other pump characteristics are normal, equal adjustments of the suction valves will cause equalized delivery from all pumps. However, leaking pump plunger packing and leaking suction valves and any other leaks from pump plunger chamber back to the pump suction or to the atmosphere will cause the vertical step in the card to be shortened with a normal suction valve setting. As plunger packing leaks are visible and as suction valve adjustment can be readily inspected it is easy to determine if there is a leak back to the pump suction through a suction valve leak. If volume indicator cards are taken with the engine running and any of the above faults are found to exist, but it is undesirable to stop the engine for repairs, the suction valve tappet adjustment can be changed while the engine is running. After the adjustment is made another volume indicator card is taken to check the adjustment.

The type of volume indicator which has just been described is of two piece body construction. This type has the advantage of having the drum and pencil carrier well enclosed. This is an important consideration because the instrument is to be kept permanently installed on the engine; and it is therefore subject to incidental knocks as are other parts of the engine. A disadvantage of this type is that it is more difficult to put an indicator card on the drum. Another disadvantage is, that as there are two pieces in the body, the cost of manufacture would be higher than if one piece body construction were used.

Figures 7, 8, 9 and 10 show a volume indicator of one piece body construction. This is much simpler in construction. Its functioning is identical to that of the two piece construction, the basic difference being that the drum 34, and the pencil carrier, 49, are outside of the instrument; and that the one piece body, 118, takes the place of parts, 15, and 16 of Figure 4.

The detail differences are:

(a) Vent connection, 119, takes the place of vent connection, 56, of Figure 4.

(b) Pencil carrier, 49, is carried by an extension stud, 120, instead of the screw, 48, of Figure 5. This extension stud, 120, also takes the place of the guide pin, 50, of Figure 4. It slides in the guide, 121, which is a slot in the side of the indicator body.

(c) The pencil carrier being loosely attached to the extension stud, 120, requires a steady bearing at its top. This is provided by a groove in the body casting at, 122, in which the pencil carrier, 49, is fitted. The pencil carrier is held into this groove by clip, 123, and screw, 124.

(d) The ratchet lever, 125, forms a ring which runs around the body of the indicator as shown in Figures 7, 8, 9 and 10, by the number, 125. The oscillating motion of this lever ring is prevented from affecting the drum 34 by a ring, 126, which is fixed in its position by screw, 127, which screws into the body casting, 118.

(e) The lever ring, 125, is given its backward motion by spring, 128. On one end it is attached to pin, 129, which in turn screws into lever ring, 125. The spring's other end is attached to pin, 130, which in turn passes through a slot, 131, in the lever ring. Its function is the same as that of spring, 43, of Figure 2.

(f) Ratchet pawl, 132, takes the place of pawl, 37, of Figure 2. It is held in engagement with the ratchet teeth on drum, 34, by a tortional spring, 133.

(g) The indicator body is shown provided with a threaded connection, 134, for attaching it to the fuel pump body or to the manifold in the fuel lines as will be described below.

The advantages of this one piece body type of indicator are that it can be manufactured cheaply; the indicator drum is very accessible; and it is much more compact.

In general the one piece type is better for portable use or where it is to be used in a manifold installed in the fuel lines. The two piece type is better where there is plenty of space and where it is to be made a part of the pump.

Figures 7 and 8 show a spray air line, 135, attached to the plug, 60, in the air cylinder of the indicator.

It is not always possible to install the volume indicator on the fuel measuring pump due to space limitation. In this case, and also in the case where an engine is in use without a volume indicator, it is advisable to install a manifold through which all the fuel oil leads run on their way to the spray valves.

Figure 11 shows one arrangement for the manifold. In this, fuel is received from a line from the fuel pump into connection 136, and 137. The oil passes from 137, into passage, 9, which is identical to passage, 9, of Figure 1. The oil passage through the manifold from this point is identical to its passage from passage, 9, of Figure 1, to the spray valve. The corresponding parts have been given similar numbers to those used in Figure 1.

Figure 12 shows a different type of manifold. It functions as follows: The fuel from the fuel pump enters passage 138, through connections, 139. Valve, 140, is normally kept open and valve, 141, is normally kept closed. The fuel then passes through passage, 142, to passage, 143, from which it passes to the spray valve. If, however, it is desired to direct the oil to the volume indicator, valve, 141, is opened and valve, 140, closed. The oil then passes through passage, 144, thence past valve, 141, to passage, 145. The volume indicator is attached to threaded connection 146. This manifold arrangement has the advantage of having both valves readily accessible and offsetting the fuel lines the minimum on the way to the spray valves. Passage, 147, runs through the manifold to connect all units of the manifold as does passage, 10, of Figure 1.

Summarily, the volume indicator has many practical advantages:

(a) Cleaning is not a vitally important requirement for successful operation as is the case with the pressure indicator. It needs no more cleaning than other small parts of the engine.

(b) It is rugged in construction and has no parts which require very fine precision grinding. Every part can be made in an ordinary machine shope. There are no finely calibrated springs to be made and frequently tested.

(c) No planimeter with its incidental errors or laborious process, such as the laying out of ordinates on a pressure indicator card to determine the mean effective pressures, is required to read the record graphs of the volume indicator.

(d) The volume indicator provides an easy, practicable and sure means of determining the quality of fuel measuring pump performance without stopping the engine.

(e) It exposes no oil to the engine room—the entire circuit being closed.

(f) It puts the record graphs for the entire engine on one card.

(g) It provides a record graph which besides being very easily read can be read with much greater accuracy than can a pressure indicator card.

(h) It requires no proportional or accurately timed reducing motion to actuate the drum.

(i) It provides a means of measuring the net amount of fuel being delivered to the spray valve irrespective of the condition of the fuel pump.

(j) It provides a means for analysing the faults of a fuel measuring pump.

(k) It is self compensating for different spray air pressures.

(l) Finally, after the fuel to the various cylinders has been balanced up by use of the volume indicator an intelligent analysis of other engine faults can be made. With the usual method of operation the exact amount of fuel being used cannot be determined. Pressure indicator cards are taken and if mean effective pressures are unbalanced the fuel quantity is increased to the cylinder having a low mean effective pressure. This procedure may or may not be correct. The volume indicator provides a practicable and accurate means of determining this question of procedure.

(m) The volume indicator is a safety instrument. In the case where a low mean effective pressure is found to obtain in a working cylinder, and where this is actually due to poor atomization or other factor causing slow burning, but which low pressure is thought due to low fuel supply, the fuel pump is changed so as to deliver more fuel. This results in proportionally greater afterburning with correspondingly more detrimental effects on exhaust valves and cages or exhaust ports in two cycle engines, besides a smoky exhaust. The volume indicator provides a reliable means for determining when an excess amount of fuel is being delivered to the spray valve.

(n) The volume indicator shows whether or not a cylinder is receiving an excess of fuel. If there is an excess of fuel a high exhaust temperature is expected. But high exhaust temperatures may obtain with normal charges of fuel, where atomization is poor.

It is plain therefore that the exhaust temperature is not a measure of amount of fuel being delivered to a cylinder. This is one reason why the exhaust pyrometer is not an absolute safeguard against uneven loading of the working cylinders.

What I claim is:—

1. A volume indicator for gas engines including a fuel pump, a fuel line to spray valve, an indicating means consisting of a drum, a record card carried thereby, a pencil operable upon the card, and means for actuating the pencil, said means comprising a plunger controlled by the difference between the pressure of oil being delivered and the pressure of spray air being used in the engine.

2. A fuel volume indicator for gas engines including a fuel pump, a fuel line to spray valve, an oil cylinder, an air cylinder, a recording means, a pencil operable thereon, and means for actuating the pencil, said means comprising a plunger operable within the said cylinders and controlled by the difference of pressure therein.

3. A fuel volume indicator for gas engines including a fuel pump, a fuel line to spray valve, an oil cylinder, an air cylinder, said cylinders having different areas, a recording means, a pencil operable thereon, and means for actuating the pencil, said means comprising a plunger operable in the cylinders and having diameters corresponding to those of the cylinders, said plunger being controlled by the difference in pressure in the cylinders.

4. A fuel volume indicator for gas engines including a fuel pump, an indicating mechanism operated by a difference in pressure exerted there against by the fuel from the pump, a manifold, a fuel line from the pump to the manifold, a fuel line from the manifold to spray valve, and a fuel line from the manifold to the indicating mechanism, said manifold admitting fuel to the indicating mechanism line while temporarily excluding fuel from the spray valve line.

5. A fuel volume indicator for gas engines including a fuel pump, an indicating mechanism operated by a difference in pressure exerted there against by the fuel from the pump, a manifold having a fuel inlet and fuel outlets to the indicating mechanism and spray valve, a valve controlling the inlet, a valve controlling the outlet to the indicating mechanism, and a valve controlling the outlet to spray valve.

Signed at Washington, District of Columbia, this 14th day of June, 1926.

JOHN E. CANOOSE.